April 4, 1950      O. E. SAUER ET AL      2,502,483
VEHICLE BUMPER
Filed Nov. 22, 1947
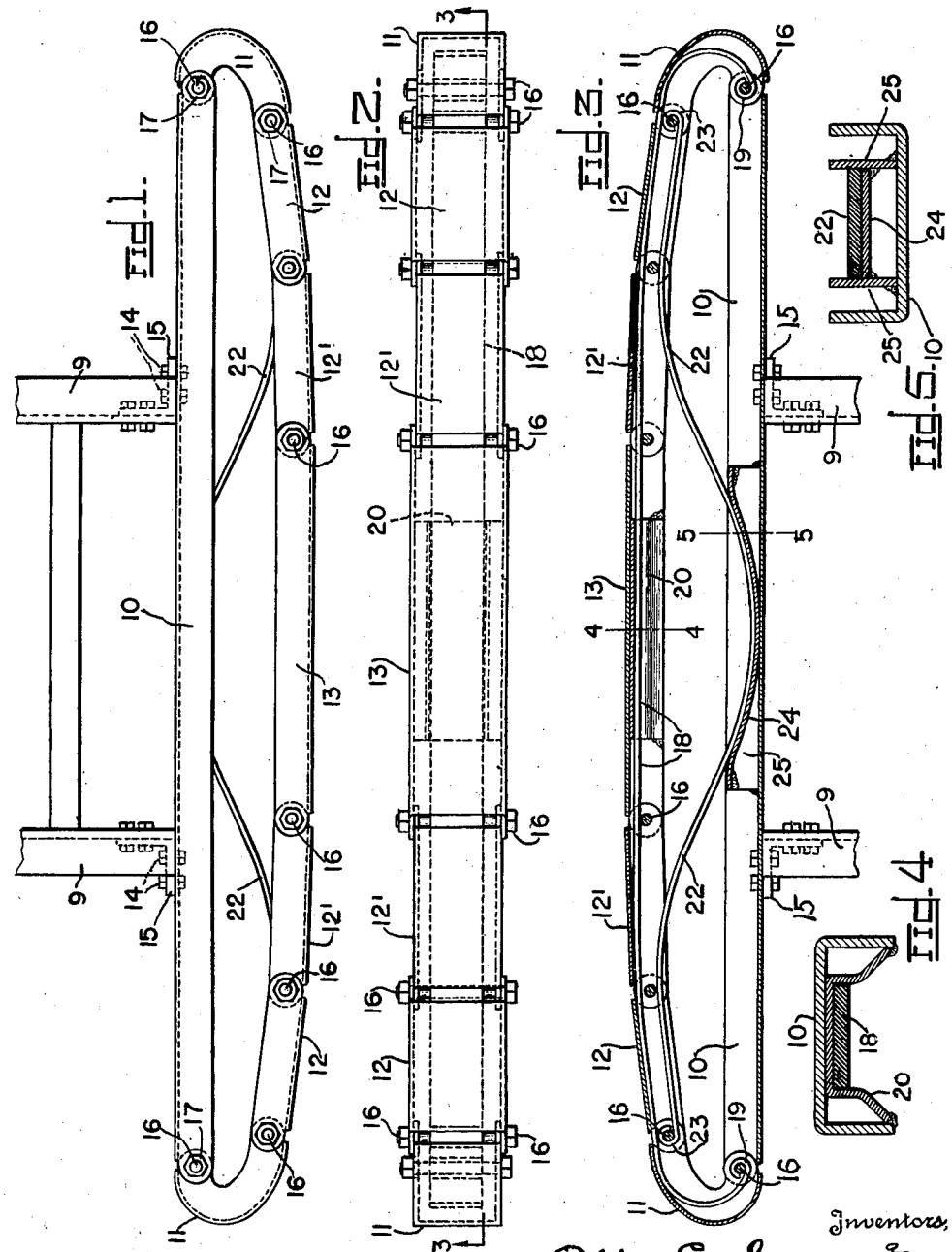
Inventors,
Otto E. Sauer and
Edmond A. Martell,
By Arthur F. Randall, atty.

Patented Apr. 4, 1950

2,502,483

UNITED STATES PATENT OFFICE 2,502,483

VEHICLE BUMPER

Otto E. Sauer, Medford, and Edmund A. Martell, Boston, Mass.

Application November 22, 1947, Serial No. 787,528

2 Claims. (Cl. 293—89)

This invention relates to bumpers for vehicles, particularly motor vehicles, and it has for its object to provide an improved bumper of the class referred to which will be of efficient, strong and comparatively inexpensive construction; which will be particularly adapted for heavy duty on trucks and the like, and which will effectually cushion blows imposed thereon.

To these ends we have provided an improved bumper for vehicles which, in the preferred embodiment thereof, comprises a plurality of metal channel members or links pivotally fastened together end to end to provide an endless approximately elliptical articulated chain of metal channel members or links, the inner side of said chain structure including an elongate metal channel member adapted to be fixed to the chassis of a vehicle in a horizontal position where the bumper extends across one end of the vehicle in position to protect the latter. Our invention is also characterized by the provision of spring means protectively housed within, and to a substantial extent hidden from view by, the channel members or links, between the flanges thereof, for yieldingly maintaining the outer side of said endless chain structure taut and spaced away from said elongate member.

Other features of the invention are hereinafter pointed out.

In the accompanying drawings:

Figure 1 is a top plan view of a vehicle bumper constructed in accordance with this invention.

Figure 2 is a front elevation of the bumper shown in Fig. 1.

Figure 3 is a section on line 3—3 of Fig. 2.

Figure 4 is a section on line 4—4 of Fig. 3.

Figure 5 is a section on line 5—5 of Fig. 3.

The illustrated embodiment of our invention comprises a plurality of metal channel members or links 10, 11, 12, 12' and 13 whose flanges are pivotally connected end to end to provide an endless chain structure of ellipsoidal form as viewed in plan, with the webs of all of said channel members or links disposed outermost and vertically.

The member 10 is an elongate metal channel of a length to extend across and in front of the end of the body of a motor vehicle, said member being provided intermediate its ends with apertures for the reception of bolts 14 by which it is fastened to angles 15 which, in turn, are bolted to the side-bars 9, 9, of the chassis of the vehicle.

At each end thereof the two flanges of the fixed channel member 10 overlap the proximate ends of the two flanges of an outwardly extending arcuate channel link 11 and are pivotally connected therewith by a bolt 16 equipped with a nut 17, said bolt occupying apertures provided in all four flanges.

The outer ends of the two flanges of each arcuate channel link 11 are overlapped by the proximate ends of the two flanges of a relatively short straight channel link 12 and are pivotally connected therewith by another bolt 16 equipped with a nut 17, said bolt likewise occupying apertures provided in all four flanges. The opposite ends of the flanges of each channel link 12 overlap, and are likewise pivotally connected with, the proximate ends of the flanges of a second relatively short straight channel link 12' by means of a bolt 16 equipped with a nut. The opposite ends of the flanges of each channel link 12' are overlapped by the proximate ends of the flanges of an intermediate straight channel link 13 to which they are likewise pivotally connected by means of a bolt 16 equipped with a nut 17. This intermediate channel link 13 may, as shown, be of greater length than the links 12 and 12' but of much less length than the fixed channel member 10.

Housed within the channel links 11, 12, 12' and 13, between the webs thereof and the bolts 16, is an outwardly bowed leaf spring 18 formed at its opposite ends with eyes 19 that are occupied by the two bolts 16 by which the outwardly arcuate links 11, 11, are connected with the fixed member 10. The spring 18 is less in width than the distance between the inner sides of the flanges of the link elements and therefore, in order to retain said spring midway between said flanges there is provided within the link 13 at the middle thereof a short metal channel member 20 (Figs. 2, 3 and 4) less in width than the interiors of the link elements and within which the spring 18 is fitted. This channel member 20 holds spring 18 against edgewise displacement relatively to the links and is itself integrated with link 13 by welding as shown in Fig. 4.

Housed at its middle within the fixed channel member 10 is a bow-shaped metal leaf spring 22 having divergent end portions which extend across the space separating the inner and outer sections of the bumper into said outer section where they are formed at their extremities with eyes 23, 23, that are occupied by the bolts 16 which connect the arcuate sections 11 with their proximate sections 12, 12. The middle portion of the bow-shaped spring 22 is arcuate as shown and seated within a saddle or pocket comprising an arcuate bottom wall 24 disposed between and welded to a pair of relatively perpendicular side walls 25. These side walls are fitted edgewise against the inner face of the web of the fixed channel member 10 (Fig. 5) and integrated therewith by welding as shown. Thus the spring 22 not only cooperates with spring 18 to hold the outer section of the bumper spaced away from fixed member 10 but it also serves, with the assistance of the saddle 24—25, to yieldingly oppose endwise displacement of the outer section of the bumper under the influence of a blow delivered obliquely thereon.

We have constructed the above described bumper having the following characteristics: Over-all length six feet, nine and one-half inches; distance between bolt holes of each arcuate link 11, center to center, five and one-half inches; distance between bolt holes of each outermost link 12, center to center, nine inches and three-quarters; distance between bolt holes of each innermost link 12', center to center, eleven inches and three-quarters; distance between bolt holes of link 13, center to center, twenty-six inches; distance between bolt holes of fixed member 10, center to center, six feet and two inches; both springs made from strip steel measuring three-eights of an inch by three and one-half inches; all bolts six and one-half inches by five-eighths, and all channel members measuring in cross-section, two and one-half inches by six inches by one-quarter inch. After assembling the inner and outer sections of the bumper are spaced apart four and one-half inches at the middle of the bumper. Bolts six inches long and five-eighths of an inch in diameter are employed.

A bumper constructed according to these specifications is strong and sturdy and has capacity for heavy duty service on a truck or bus, but these specifications, of course, may be varied for other types of vehicles.

What we claim is:

1. A bumper for vehicles comprising a plurality of metal channel links disposed end to end to provide an endless chain assembly of oblong form having the webs of all of the links disposed upon the exterior thereof and the ends of proximate flanges of the links overlapped and formed with registering bolt holes, and bolts occupying the registering bolt holes of said overlapping flanges and pivotally connecting said links, said assembly including an inner elongate link to be fixed in horizontal position across one end of the vehicle; two links extending laterally outwardly from and connecting the opposite ends of said elongate link with the opposite ends of an outer series of links disposed alongside of said elongate link, and spring means housed within the channels of said links, and to a substantial extent hidden from view by the latter, for yieldingly maintaining said outer series of links spaced away from said fixed elongate link, said spring means including a bowed leaf spring element disposed between the webs of said links and said bolts and formed at its opposite ends with eyes that are occupied by the bolts at the opposite ends of said elongate link.

2. A bumper for vehicles according to claim 2 wherein said elongate link is made at its middle and upon its interior with an arcuate pocket for a spring and wherein said spring means also includes a bowed leaf spring having an arcuate middle portion occupying said pocket and divergent arms at the opposite ends thereof formed at their extremities with eyes that are occupied by two of said bolts that are adjacent to the opposite ends of said outer series of links.

OTTO E. SAUER.
EDMUND A. MARTELL.

REFERENCES CITED

The following references are of record in the file of this patent:

UNITED STATES PATENTS

| Number | Name | Date |
|---|---|---|
| 1,362,195 | Sills | Dec. 14, 1920 |
| 1,411,052 | McGowen | Mar. 28, 1922 |
| 1,792,157 | Franke | Feb. 10, 1931 |